US012628003B2

(12) United States Patent
Lo et al.

(10) Patent No.: US 12,628,003 B2
(45) Date of Patent: May 12, 2026

(54) MULTIPLE-ANTENNA SYSTEM FOR CELL-SPECIFIC AND USER-SPECIFIC TRANSMISSION

(71) Applicant: Neo Wireless LLC, Wayne, PA (US)

(72) Inventors: Titus Lo, Bellevue, WA (US); Xiaodong Li, Kirkland, WA (US)

(73) Assignee: Neo Wireless LLC, Wayne, PA (US)

( * ) Notice: Subject to any disclaimer, the term of this patent is extended or adjusted under 35 U.S.C. 154(b) by 391 days.

(21) Appl. No.: 18/515,785

(22) Filed: Nov. 21, 2023

(65) Prior Publication Data

US 2024/0089749 A1     Mar. 14, 2024

Related U.S. Application Data

(63) Continuation of application No. 17/544,482, filed on Dec. 7, 2021, now Pat. No. 11,825,314, which is a
(Continued)

(51) Int. Cl.
H04W 16/28     (2009.01)
H01Q 1/24     (2006.01)
(Continued)

(52) U.S. Cl.
CPC ............ H04W 16/28 (2013.01); H01Q 1/246 (2013.01); H01Q 25/00 (2013.01); H04B 7/0617 (2013.01);
(Continued)

(58) Field of Classification Search
CPC ............. H04W 16/28; H04W 56/0005; H04W 56/001; H04W 72/0453; H04W 88/08;
(Continued)

(56) References Cited

U.S. PATENT DOCUMENTS 6,005,515 A * 12/1999 Allen ....................... H01Q 3/42
                                                                    342/368
6,167,286 A * 12/2000 Ward ................... H04B 7/0491
                                                                    455/562.1
(Continued)

OTHER PUBLICATIONS

ANSI/IEEE Std 802.11, 1999 Edition (R2003), Information technology—Telecommunications and information exchange between systems—Local and metropolitan area networks—Specific requirements—Part 11: Wireless LAN Medium Access Control (MAC) and Physical Layer (PHY) Specifications (Reaffirmed Jun. 12, 2003).
(Continued)

*Primary Examiner* — Ankur Jain
(74) *Attorney, Agent, or Firm* — Volpe Koenig

(57)     ABSTRACT

A reception method and apparatus for use in a multi-cell orthogonal frequency division multiple access (OFDMA) wireless system. In a unicast receive mode during a first receive time period, a first group of orthogonal frequency division multiplexing (OFDM) symbols is received by a mobile device from multiple of a plurality of antennas at a serving base station. In a single-frequency-network (SFN) receive mode during a second receive time period, a second group of OFDM symbols is received by the mobile device from one of a plurality of antennas at the serving base station. The transition between the first receive time period and the second receive time period occurs during a cyclic prefix or a cyclic postfix between OFDM symbols, and the plurality of antennas produce a first beam pattern during the unicast receive mode and a second beam pattern during the SFN receive mode.

20 Claims, 14 Drawing Sheets

Related U.S. Application Data continuation of application No. 16/788,872, filed on Feb. 12, 2020, now Pat. No. 11,197,172, which is a continuation of application No. 16/208,491, filed on Dec. 3, 2018, now Pat. No. 10,567,976, which is a continuation of application No. 15/155,975, filed on May 16, 2016, now Pat. No. 10,149,173, which is a continuation of application No. 14/725,254, filed on May 29, 2015, now Pat. No. 9,344,313, which is a continuation of application No. 13/668,102, filed on Nov. 2, 2012, now Pat. No. 9,048,540, which is a continuation of application No. 13/396,487, filed on Feb. 14, 2012, now Pat. No. 8,326,366, which is a continuation of application No. 13/276,240, filed on Oct. 18, 2011, now Pat. No. 8,116,822, which is a continuation of application No. 11/908,262, filed as application No. PCT/US2006/060888 on Nov. 14, 2006, now Pat. No. 8,041,395.

(60) Provisional application No. 60/736,500, filed on Nov. 14, 2005.

(51) Int. Cl.

| | |
|---|---|
| *H01Q 25/00* | (2006.01) |
| *H04B 7/06* | (2006.01) |
| *H04L 5/00* | (2006.01) |
| *H04L 27/26* | (2006.01) |
| *H04W 56/00* | (2009.01) |
| *H04W 72/0453* | (2023.01) |
| *H04W 88/08* | (2009.01) |

(52) U.S. Cl.
CPC .......... *H04L 5/005* (2013.01); *H04L 27/2605* (2013.01); *H04W 56/0005* (2013.01); *H04W 56/001* (2013.01); *H04W 72/0453* (2013.01); *H04W 88/08* (2013.01)

(58) Field of Classification Search
CPC ...... H01Q 1/246; H01Q 25/00; H04B 7/0617; H04L 5/005; H04L 27/2605
See application file for complete search history.

(56) References Cited

U.S. PATENT DOCUMENTS

| | | | | |
|---|---|---|---|---|
| 6,728,554 | B1 * | 4/2004 | Wegner | H04B 7/0408 |
| | | | | 455/562.1 |
| 7,289,834 | B2 | 10/2007 | Sun et al. | |
| 8,041,395 | B2 | 10/2011 | Lo et al. | |
| 8,116,822 | B1 | 2/2012 | Lo et al. | |
| 2004/0001554 | A1 * | 1/2004 | Sun | H04B 7/086 |
| | | | | 375/260 |
| 2012/0063540 | A1 * | 3/2012 | Aoki | H04L 5/0048 |
| | | | | 375/295 |
| 2012/0142400 | A1 | 6/2012 | Lo et al. | |

OTHER PUBLICATIONS

International Search Report and Written Opinion, International Application No. PCT/US06/6088, filed Nov. 14, 2006; Applicant: Neocific, Inc.; mailed Oct. 29, 2007; 11 pages.
Third Generation Partnership Project, "Technical Specification Group Radio Access Network; Physical Channels and Modulation (Release 8)," 3GPP TS 36.211 V0. 1.0 (Oct. 2006).
Third Generation Partnership Project, "Technical Specification Group Radio Access Network; Multiplexing and channel coding (Release 8)," 3GPP TS 36.212 V0.1.0 (Oct. 2006).
Third Generation Partnership Project, "Technical Specification Group Radio Access Network; Physical layer procedures (Release 8)," 3GPP TS 36.213 V0.1.0 (Oct. 2006).

* cited by examiner

1020

Elevation pattern control

1022

Beamformer

A    B    C

N RF feeds    N RF feeds    N RF feeds

1024

1002

A 3-dimensional antenna system (e.g., circular array), which can be used to provide coverage to all sectors of a cell.

1000

Elevation pattern control

N antenna elements

1004

A, B, or C N RF feeds

1002

A 2-dimensional antenna system, which can be used to provide coverage to a sector.

MULTIPLE-ANTENNA SYSTEM FOR CELL-SPECIFIC AND USER-SPECIFIC TRANSMISSION

CROSS-REFERENCE TO RELATED APPLICATIONS(S)

This application is a continuation of U.S. patent application Ser. No. 17/544,482, filed Dec. 7, 2021, which issued as U.S. Pat. No. 11,825,314 on Nov. 21, 2023, which is a continuation of U.S. patent application Ser. No. 16/788,872, filed Feb. 12, 2020, which issued as U.S. Pat. No. 11,197, 172 on Dec. 7, 2021, which is a continuation of U.S. patent application Ser. No. 16/208,491, filed Dec. 3, 2018, which issued as U.S. Pat. No. 10,567,976 on Feb. 18, 2020, which is a continuation of U.S. patent application Ser. No. 15/155, 975, filed May 16, 2016, which issued as U.S. Pat. No. 10,149,173 on Dec. 4, 2018, which is a continuation of U.S. patent application Ser. No. 14/725,254, filed May 29, 2015, which issued as U.S. Pat. No. 9,344,313 on May 17, 2016, which is a continuation of Ser. No. 13/668,102, filed Nov. 2, 2012, which issued as U.S. Pat. No. 9,048,540 on Jun. 2, 2015, which is a continuation of Ser. No. 13/396,487, filed Feb. 14, 2012, which issued as U.S. Pat. No. 8,326,366 on Dec. 4, 2012, which is a continuation of U.S. patent application Ser. No. 13/276,240, filed on Oct. 18, 2011, which issued as U.S. Pat. No. 8,116,822 on Feb. 14, 2012, which is a continuation of U.S. patent application Ser. No. 11/908, 262, filed on Oct. 30, 2008, which issued as U.S. Pat. No. 8,041,395 on Oct. 18, 2011, which is the U.S. National Stage, under 35 U.S.C. § 371, of International Patent Application No. PCT/US06/060888, filed on Nov. 14, 2006, which claims the benefit of U.S. Provisional Application No. 60/736,500, filed on Nov. 14, 2005, the contents of which are hereby incorporated by reference herein.

TECHNICAL FIELD

The disclosed embodiments relate, in general, to wireless communication and, in particular, to antenna systems for use in cellular communication and broadcasting.

BACKGROUND

An antenna system is an indispensable component of any wireless communication network. Wireless communications is presently available in many forms, among which the most common one is cellular/mobile communications.

In a cellular wireless network, the geographical region to be services by the network is normally divided into smaller areas called cells. Within each cell are mobile stations (MSs) that are used by users to access the network. A cell may be further divided into multiple sectors and in each sector the coverage is provided by a base station (BS). A BS also serves as a focal point to distribute information to and collect information from MSs that are located in the cell by radio signals that are transmitted by the BS antenna.

There are different types of transmissions carried out by BSs. A BS can send specific data to an individual MS within its sector; a BS may also send a set of common data to all the MSs with its sector; a BS may also send data via a common channel to all the MSs within a cell; and a group of BSs may broadcast information via a common channel simultaneously to all MSs within a group of cells. Depending on the type of transmission, a distinctive set of requirements may be required for the BS antenna system in terms of radiation patterns, power settings; etc. In addition, a frequency-reuse scheme may impose constraints on the antenna system. The extent to which an antenna system meets the wide range of requirements and constraints directly impacts on the wireless network performance. Therefore, there is a need to create an antenna system that is reconfigurable, adjustable, and controllable to enable a BS to carry out transmissions from a type of application to the other.

DETAILED DESCRIPTION

A multiple-antenna system for cellular communication and broadcasting is disclosed. The multiple-antenna system can be controlled, adjusted, configured, or reconfigured to produce desirable radiation beam patterns suitable for different types of applications (e.g., voice, data, video, etc.). For example, the multiple-antenna system can be controlled to enable unicast transmissions with a specific reuse scheme or broadcast transmissions with one or more channels.

In some embodiments; a signal distribution network is provided in the multiple-antenna system. The signal distribution network is embedded in a transmitter at a base station (BS) and controls the distribution of signals to one or more antennas. Various antenna radiation patterns suitable for different applications can be generated by reconfiguring the connections and gain settings in the signal distribution network. By shaping the azimuth pattern of a beam and activating appropriate antenna elements to produce a predefined elevation pattern of a beam, different radiation beam patterns may be generated for use in different types of applications. For example, narrow beams may be generated for use in unicast applications, whereas sector beams may be generated for use in broadcast applications.

In some embodiments, certain techniques are employed to manage the transition from one type of transmission mode to another type of transmission mode. A transmission mode may correspond to a particular antenna beam pattern or to other settings for a particular application.

The following discussion contemplates the application of the disclosed technology to a multi-carrier system, such as Orthogonal Frequency Division Multiplexing (OFDM), Orthogonal Frequency Division Multiple Access (OFDMA), or Multi-Carrier Code Division Multiple Access (MC-CDMA). The invention can be applied to either Time Division Duplexing (TDD) or Frequency Division Duplexing (FDD). Without loss of generality, OFDMA is therefore only used as an example to illustrate the present technology.

The following description provides specific details for a thorough understanding of, and enabling description for, various embodiments of the technology. One skilled in the art will understand that the technology may be practiced without these details. In some instances, well-known structures and functions have not been shown or described in detail to avoid unnecessarily obscuring the description of the embodiments of the technology. It is intended that the terminology used in the description presented below be interpreted in its broadest reasonable manner, even though it is being used in conjunction with a detailed description of certain embodiments of the technology. Although certain terms may be emphasized below, any terminology intended to be interpreted in any restricted manner will be overtly and specifically defined as such in this Detailed Description section.

I. Wireless Communication Network

Figure 1:
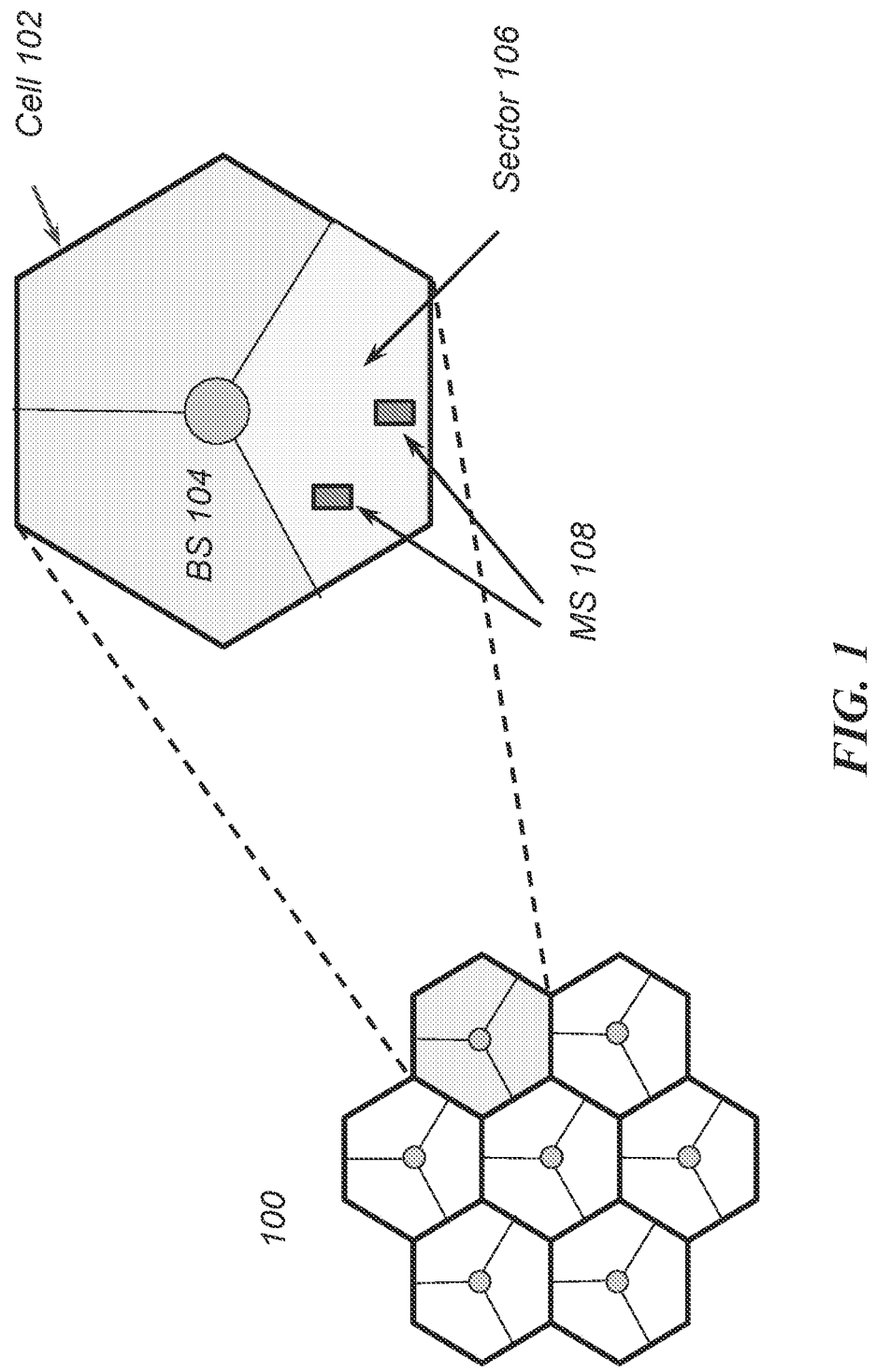
FIG. 1 illustrates the coverage of a wireless communication network that is comprised of a plurality of cells.

FIG. 1 is a representative diagram of a wireless communication network 100 that services a geographic region. The geographic region is divided into a plurality of cells 102, and wireless coverage is provided in each cell by a base station (BS) 104. One or more mobile devices (MS) 108 may be fixed or may roam within the geographic region covered by the network. The mobile devices are used as an interface between users and the network. Each base station is connected to the backbone of the network, usually by a dedicated link. A base station serves as a focal point to transmit information to and receive information from the mobile devices within the cell that it serves by radio signals. Note that if a cell is divided into sectors 106, from a system engineering point of view each sector can be considered as a cell. In this context, the terms "cell" and "sector" are interchangeable.

Figure 2:
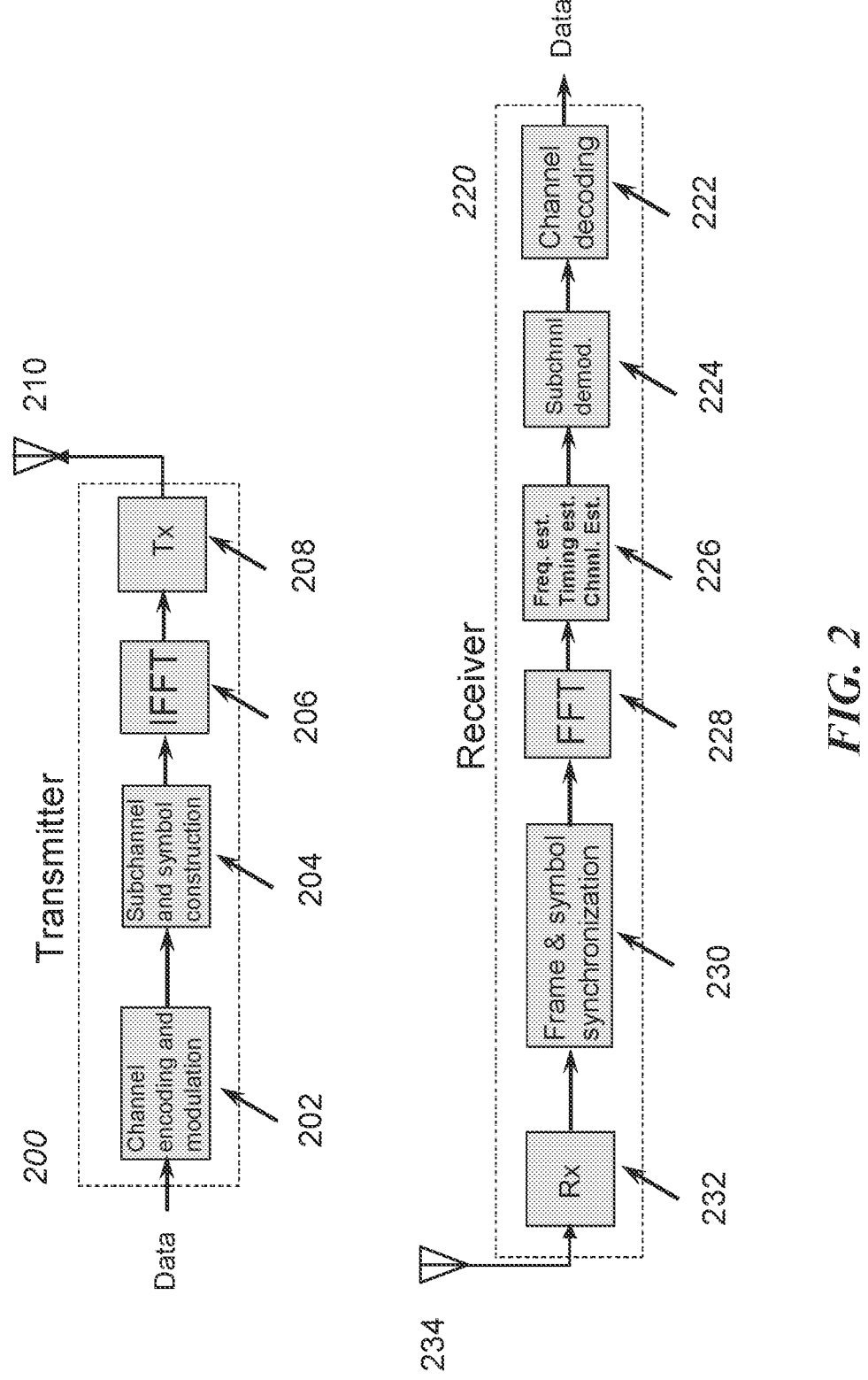
FIG. 2 is a block diagram of a receiver and a transmitter, such as might be used in a multi-carrier wireless communication network.

In a wireless communication system with base stations and mobile devices, the transmission from a base station to a mobile device is called a downlink (DL) and the transmission from a mobile device to a base station is called an uplink (UL). FIG. 2 is a block diagram of a representative transmitter 200 and receiver 220 that may be used in base stations and mobile devices to implement a wireless communication link. The transmitter comprises a channel encoding and modulation component 202, which applies data bit randomization, forward error correction (FEC) encoding, interleaving, and modulation to an input data signal. The channel encoding and modulation component is coupled to a subchannel and symbol construction component 204, an inverse fast Fourier transform (IFFT) component 206, a radio transmitter component 208, and an antenna 210. Those skilled in the art will appreciate that these components construct and transmit a communication signal containing the data that is input to the transmitter 200. Other forms of transmitter may, of course, be used depending on the requirements of the communication network.

The receiver 220 comprises an antenna 234, a reception component 232, a frame and synchronization component 230, a fast Fourier transform component 228, a frequency, timing, and channel estimation component 226, a subchannel demodulation component 224, and a channel decoding component 222. The channel decoding component de-interleaves, decodes, and derandomizes a signal that is received by the receiver. The receiver recovers data from the signal and outputs the data for use by the mobile device or base station. Other forms of receiver may, of course, be used depending on the requirements of the communication network.

Figure 3:
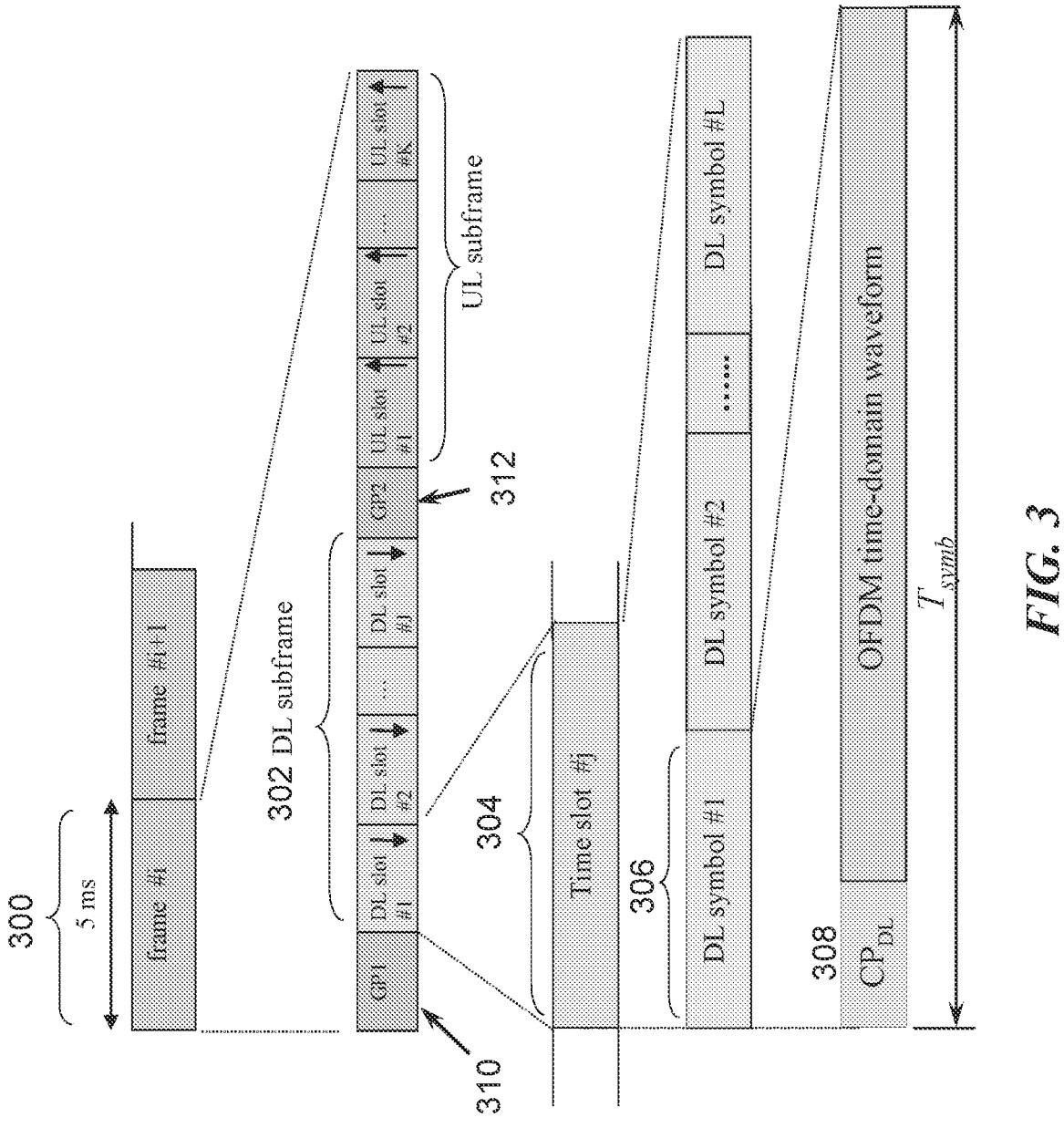
FIG. 3 is a graphical depiction of a multi-carrier signal structure in the time domain.

FIG. 3 depicts the basic structure of a multi-carrier signal in the time domain, which is generally made up of time frames 300, subframes 302, time slots 304, and OFDM symbols 306. A frame consists of a number of time slots, and each time slot is comprised of one or more OFDM symbols. The OFDM time domain waveform is generated by applying an inverse-fast-Fourier-transform (IFFT) to the OFDM signals in the frequency domain. A copy of the last portion of the time waveform, known as the cyclic prefix (CP) 308, is inserted in the beginning of the waveform itself to form the OFDM symbol. In the case of TDD, guard periods (GP1 310 and GP2 312), are inserted between an uplink (UL) subframe and a downlink (DL) subframe and between a DL subframe and a UL subframe to account for the time needed to turn on and off transmitters and receivers, as well as radio propagation delay.

II. Multiple-Antenna System for Cellular Communication and Broadcasting

In cellular communications, different types of transmission modes may be used for different types of applications. When a base station sends specific data to an individual mobile station within its sector, the transmission mode is referred to as unicast and when a base station sends the same data to all mobile stations within its sector or cell, the transmission mode is referred to as broadcast. The multiple-antenna system disclosed herein can be controlled, adjusted, configured, or reconfigured to produce desirable radiation patterns suitable for different types of applications, such as unicast transmissions with a specific reuse scheme or broadcast transmissions with one or more channels.

Although a cell divided into three sectors is used as an example herein, those skilled in the art will appreciate that a cell may be divided into an arbitrary number of sectors and that the disclosed technology is not limited by the number of sectors within a cell.

A Cellular Communication and Broadcasting Transmissions

Figure 4:
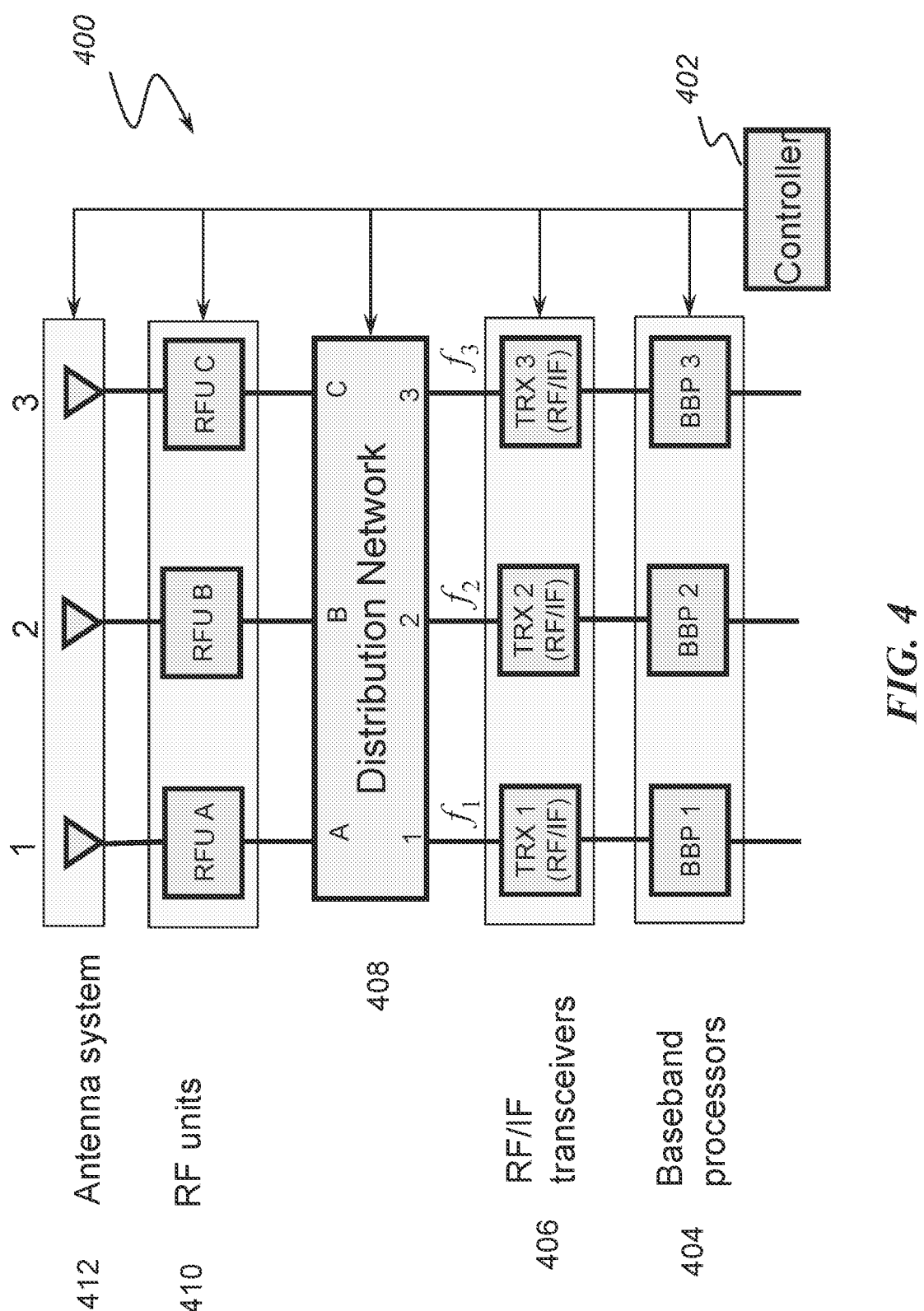
FIG. 4 is a block diagram of a particular realization of a transmitter for cellular communication and broadcast.

FIG. 4 depicts a transmitter 400 at a base station for cellular communication and broadcasting. The transmitter may consist of the following subsystems:

1. baseband processors (BBPs) 404, which process digital data, assembling or disassembling data payloads and formatting the data in accordance with certain protocols as was previously described with respect to FIG. 3;

2. intermediate frequency (IF) and radio frequency (RF) transceivers (TRXs) 406 that are coupled to the baseband processors 404 and which convert digital baseband signals from the baseband processors into analog signals for transmission;

3. a signal distribution network 408 coupled to the RF/IF transceivers 406, the signal distribution network receiving signals from the RF/IF transceivers and splitting and/or combining the signals in accordance with the requirements of particular applications being served by the transmitter;

4. RF units (RFUs) 410 that are coupled to the signal distribution network 408, the RF units amplifying the signals to a certain power level for transmission; and 5. a multiple-antenna system 412 that is coupled to the RF units 410, the multiple-antenna system transmitting the signals with various beam patterns (sectorial, omni-directional, etc.) in accordance with a transmission mode that is selected based on the frequency reuse scheme and the type of application. The multiple-antenna system depicted in FIG. 4 consists of three sector-antennas, the radiation pattern of each sector-antenna which is fan-shaped. Alternatively, the system may consist of an omni-directional antenna, the radiation pattern of which is omni-directional in azimuth. In some embodiments, the system may consist of both omni-directional antennas and sector antennas in a particular combination. For example, antenna 1 in the multiple-antenna system 412 may be an omni-directional antenna and antennas 2 and 3 may be sector antennas.

Those skilled in the art will appreciate that the subsystems in the transmitter 400 may be constructed with appropriate components and devices, such as switches, amplifiers, and/or couplers. The subsystems in the transmitter are controlled by a controller 402, which is coupled to each of the subsystems.

Figure 5:
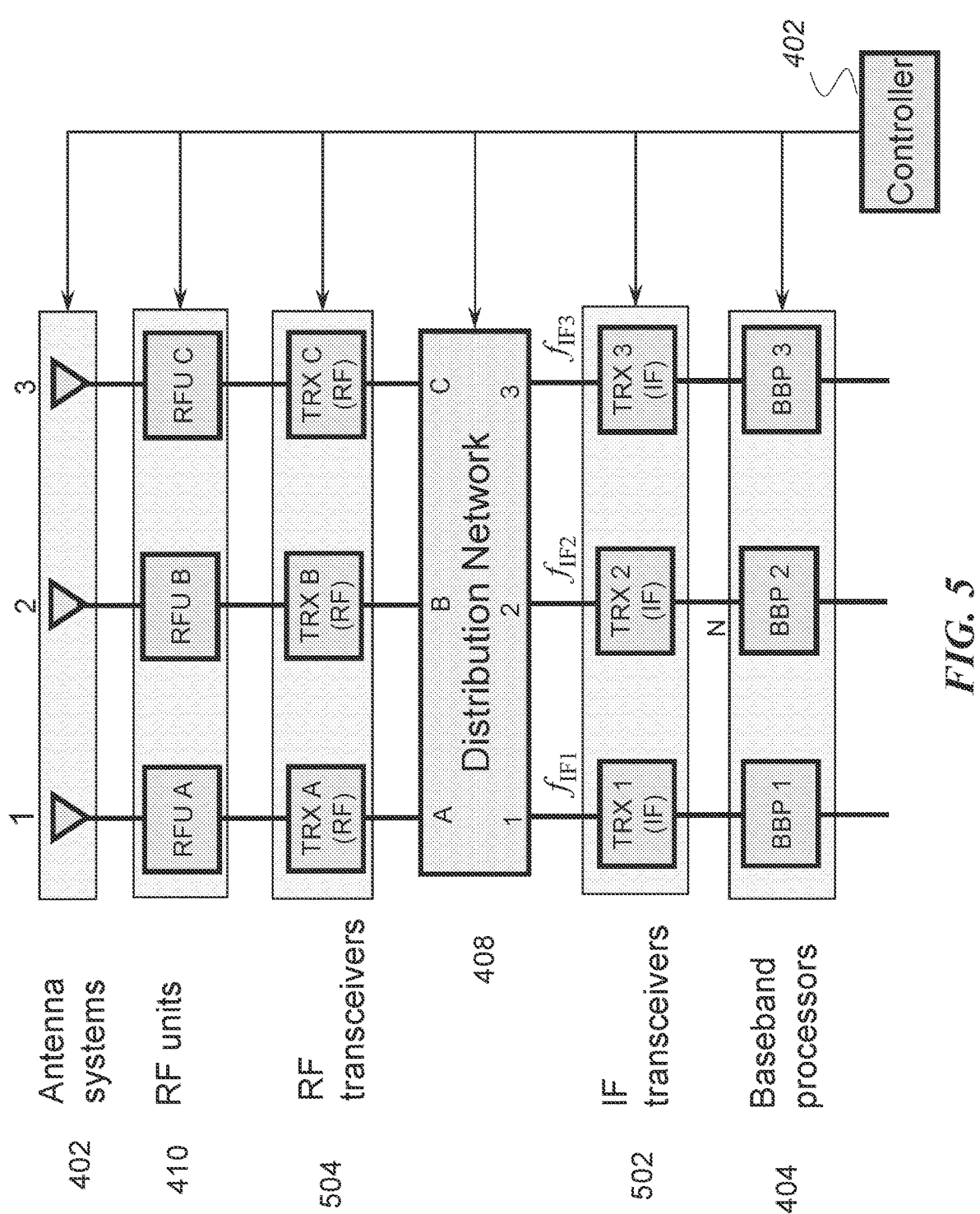
FIG. 5 is a block diagram of a variant realization of a transmitter for cellular communication and broadcast.

While the distribution network 408 is depicted between the RF/IF transceivers 406 and RF units 410 in FIG. 4, those skilled in the art will appreciate that the distribution network can be placed at various other points in the transmitter 400. For example, the distribution network can be placed between the antenna system 412 and RF units 410. Alternatively, as depicted in FIG. 5, if the functionality of the RF/IF transceivers 406 is split into IF transceivers 502 and RF transceivers 504, the distribution network 408 can be placed between the IF and RF transceivers. In the reuse-3 case (that is, each cell is split into three sectors and each sector uses a different frequency band for communication), $f_1$, $f_2$, and $f_3$ in FIG. 4 denote the three bands in RF or $f_{IF1}$, $f_{IF2}$, and $f_{IF3}$ in FIG. 5 denote the three bands in IF. In the reuse-1 case $f_1$, $f_2$, and $f_3$ represent the same RF channel or $f_{IF1}$, $f_{IF2}$, and $f_{IF3}$ represent the same IF channel.

Figure 6:
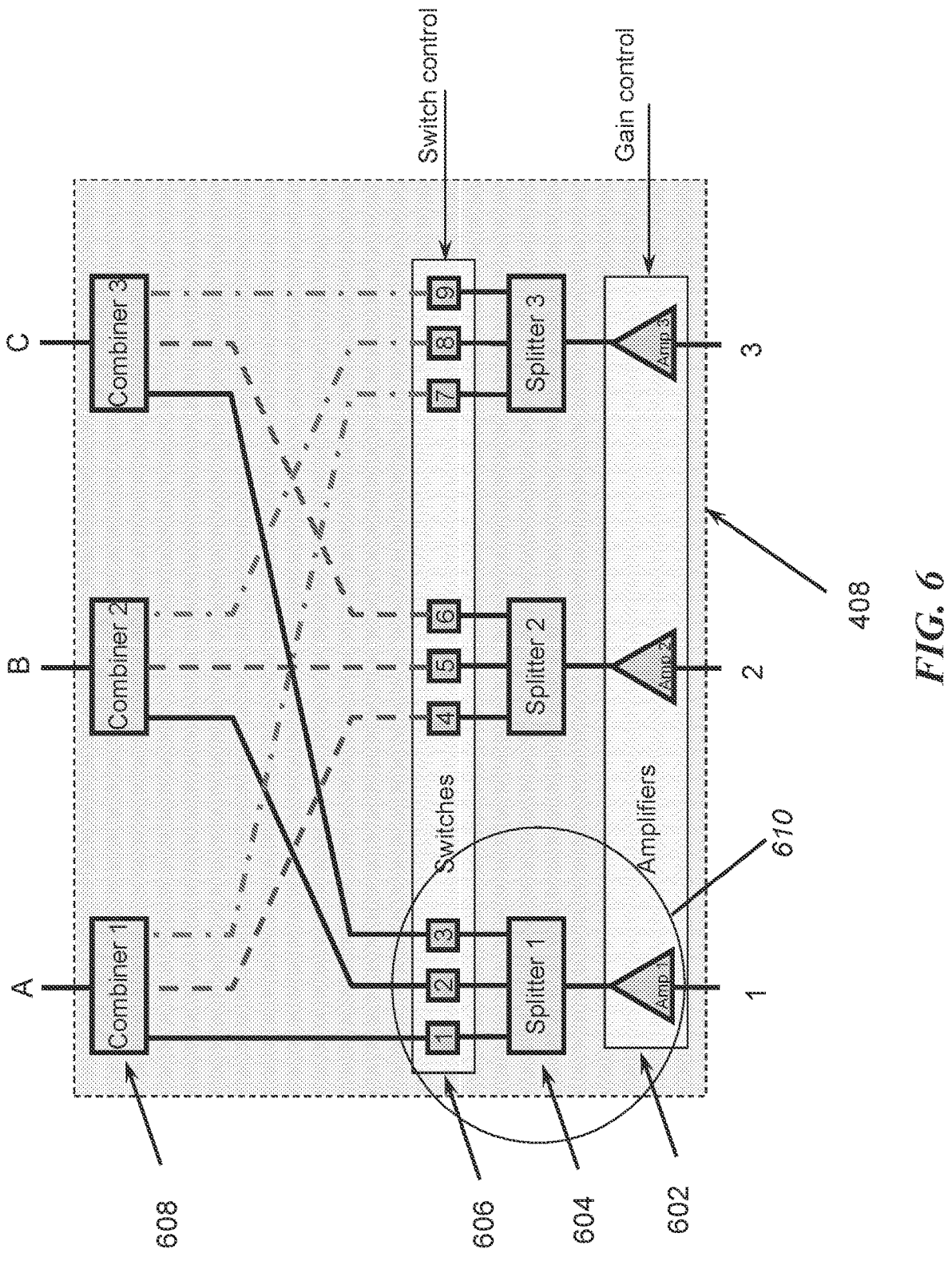
FIG. 6 is a block diagram of a distribution network used in a transmitter for cellular communication and broadcast.

The signal distribution network 408, which consists of amplifiers, splitters, switches, and combiners, is used to distribute and adjust signals so as to realize different settings or configurations required by various transmission modes to accommodate different applications. FIG. 6 depicts a typical implementation of the distribution network 408. Three signal paths through the distribution network are depicted, with three inputs (1, 2, and 3) to the distribution network and three outputs (A, B, and C) from the distribution network. Those skilled in the art will appreciate that the number of inputs to and outputs from the distribution network can be varied depending on the desired transmission modes to be implemented. The gain on each path is controlled via a corresponding amplifier 602. The output from each amplifier is coupled to a splitter 604, which splits the output from the amplifier into multiple signals. Each output from the splitter 604 is coupled to a switch 606, which may be a simple ON-OFF control device. The output from each switch is coupled to a combiner 608. The splitters 604 perform the function of splitting (or fanning out) the input signal and the combiners 608 perform the function of combining the input signals. In some embodiments, the combiners may add the signals and operate over a broad range of frequencies. By selectively controlling the gain of amplifiers 602 and the state of switches 606, the signals on outputs (A, B, and C)

may be any combination of the signals received on inputs (1, 2, 3). Additional filtering or signal conditioning (not shown) may be implemented in the signal distribution network as well.

Figure 7B:
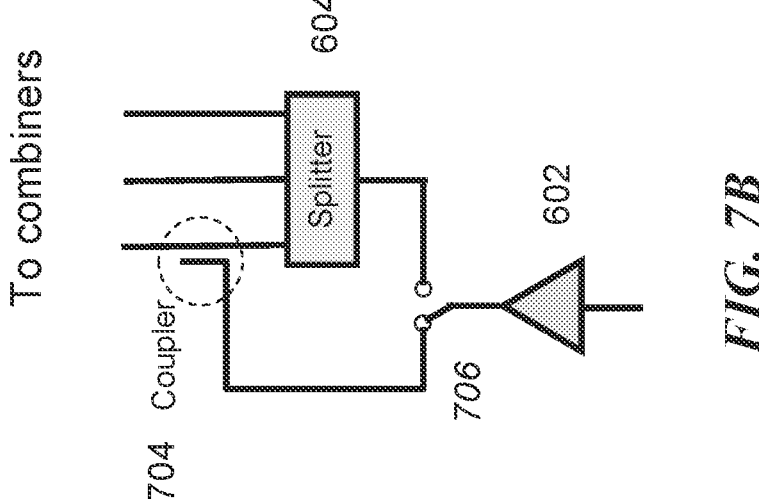
FIGS. 7A and 7B are block diagrams of alternate implementations of the distribution network.
Figure 7A:
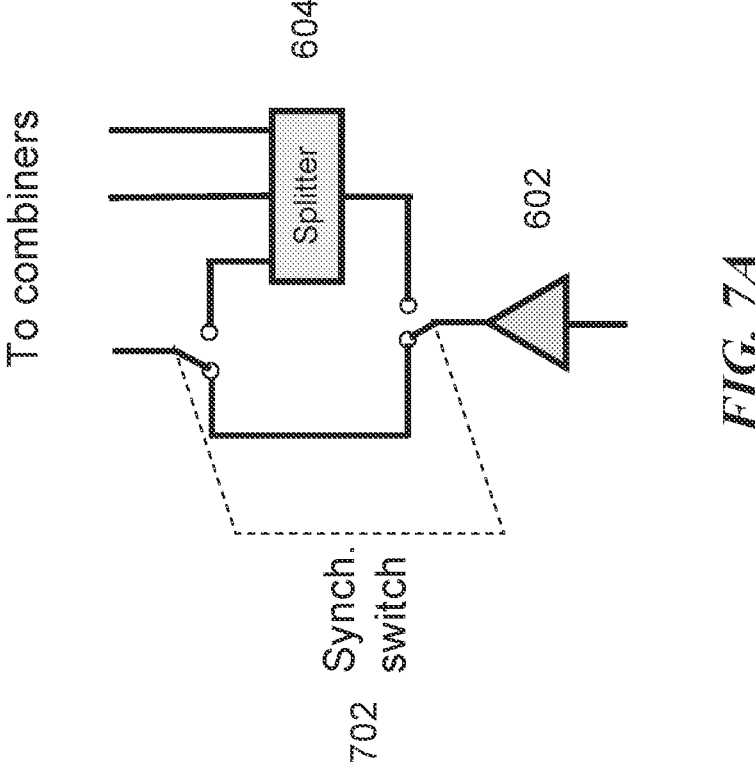

Those skilled in the art will appreciate that other configurations of components can used to achieve the same functionality as is implemented by distribution network 408. For example, the combination of an amplifier, a splitter, and switches identified by reference numeral 610 in FIG. 6 can be replaced by one of the variations shown in FIGS. 7A and 7B. In FIG. 7A, switches 606 are replaced by a switch 700 that either directly connects the amplifier 602 to the combiner, or connects the amplifier to the splitter 604. In FIG. 7B, switches 606 are replaced by a coupler 704 and a switch 706 that allows the amplifier 602 to be directly connected to the combiner, or connected to the splitter 604.

Various types of transmissions can be carried out by controlling the amplification provided by the amplifiers and the state of the switches. For example, to enable unicast transmission, switches 1, 5, and 9 are turned on and switches 2, 3, 6, 7, and 8 are turned off. When the switches are in this state, the signals received on inputs (1, 2, 3) of the distribution network are directly coupled to the outputs (A, B, C) of the distribution network. Referring to FIG. 4, if the signal flow for a sector 1 transmission were to be followed, the signals would flow from the baseband processor BBP1 through the distribution network to RFU A and antenna 1.

To enable broadcast transmission using only one channel but three sector antennas, only the switches connected to a particular splitter (for example, switches 1, 2, and 3) are turned on and the rest of the switches (in this example, 4, 6, 7, 8, and 9) are turned off. Signals generated by a particular BBP (BBP1) are thereby transmitted via all three antennas while other BBPs (BBP2 and BBP3) are not transmitted.

To enable broadcast transmission using two channels but three sector antennas, only the switches connected to a particular splitter (for example, switches 7, 8, and 9) are turned off and the rest of the switches (in this example, 1, 2, 3, 4, 5, and 6) are turned on. Signals generated by the two BBPs (BBP1 and BBP2) are thereby transmitted via all three antennas while the other BBP (BBP3) is not transmitted.

Turning on all switches enables broadcast transmission using three channels and three sector antennas. That is, signals generated by any BBP are transmitted via all three sector antennas. Some typical examples of transmission modes are listed in Table 1 with their corresponding switch states. A configuration index is provided in Table 1 to distinguish the different transmission modes and enable quick look-up of configuration information as will be described in additional detail below.

TABLE 1

| | Schemes of frequency reuse and types of transmission and their corresponding configuration index and setting | | | | |
| --- | --- | --- | --- | --- | --- |
| Config-uration Index | Frequency resuse and type of trans-mission | ON switches | OFF switches | Gain settings | Elevation Beam |
| 1 | Unicast | 1, 5, 9 | 2, 3, 4, 6, 7, 8 | Amp 1 = x1 Amp 2 = y1 Amp 3 = z1 | Conformed |
| 2 | Broadcast using one channel | 1, 2, 3 | 4, 5, 6, 7, 8, 9 | Amp 1 = x2 Amp 2 = y2 Amp 3 = z2 | Extended |
| 3 | Broadcast | 1, 2, 3, | 7, 8, 9 | Amp 1 = x3 | Extended |

TABLE 1-continued

| | | | | | |
|---|---|---|---|---|---|
| Schemes of frequency reuse and types of transmission and their corresponding configuration index and setting | | | | | |
| Config-uration Index | Frequency resuse and type of trans-mission | ON switches | OFF switches | Gain settings | Elevation Beam |
| | using two channels | 4, 5, 6 | | Amp 2 = y3 Amp 3 = z3 | |
| 4 | Broadcast using all channels | 1, 2, 3, 4, 5, 6, 7, 8, 9 | N/A | Amp 1 = x4 Amp 2 = y4 Amp 3 = z4 | Extended |

While Table 1 represents many of the most common transmission modes, other combinations of the switch states can be employed to enable transmissions for specific applications. For example, with switches 1, 2, 4, 5, and 9 on and the rest of the switches off, signals generated by BBP1 and BBP2 are transmitted using two channels in both Sector 1 and Sector 2, whereas signals generated by BBP3 are only transmitted in its own corresponding sector (i.e., Sector 3). The number of transmission modes is only limited by the construction of the signal distribution network and antennas.

The switch configuration necessary to achieve a desired transmission mode may also depend, in part, on the types of antennas used in the multi-antenna system 412. For example, if antenna 1 in the multiple-antenna system 412 is an omni-directional antenna and antennas 2 and 3 are sector antennas, a broadcast transmission mode can be enabled using only the omni-directional antenna. With switch 1 turned on, signals from BBP1 (one channel) are transmitted through antenna 1 With switches 1 and 4 turned on, signals from both BBP1 and BBP2 (two channels) are transmitted through antenna 1. With switches 1, 4, and 7 turned on, signals from all BBPs (three channels) are transmitted through antenna 1.

In other embodiments, the gain setting on each path is set according to a specific scheme of frequency reuse and a specific type of transmission by the adjustable amplifier.

B Controllable Beam Patterns for Cellular Communication and Broadcasting

Figure 8:
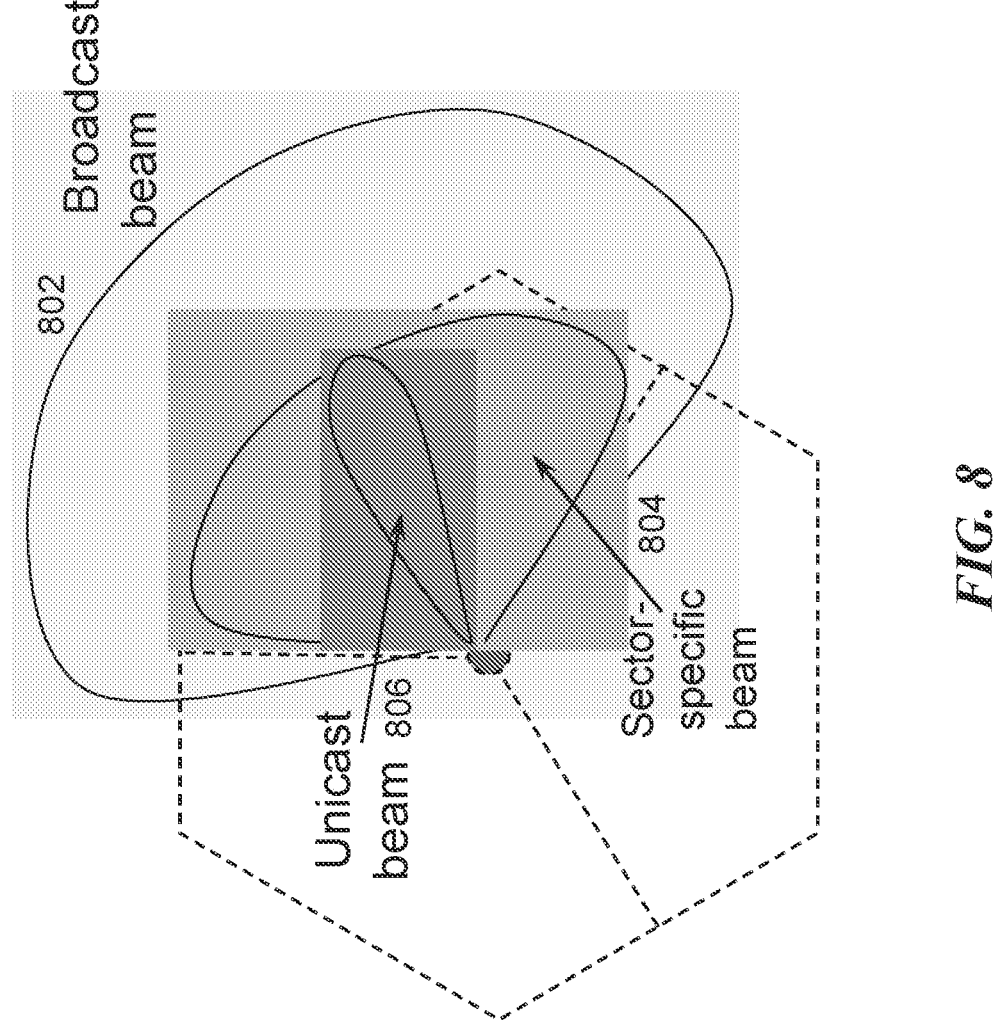
FIG. 8 is a graphical depiction of using different types of antenna beams for different types of transmissions.
Figure 9:
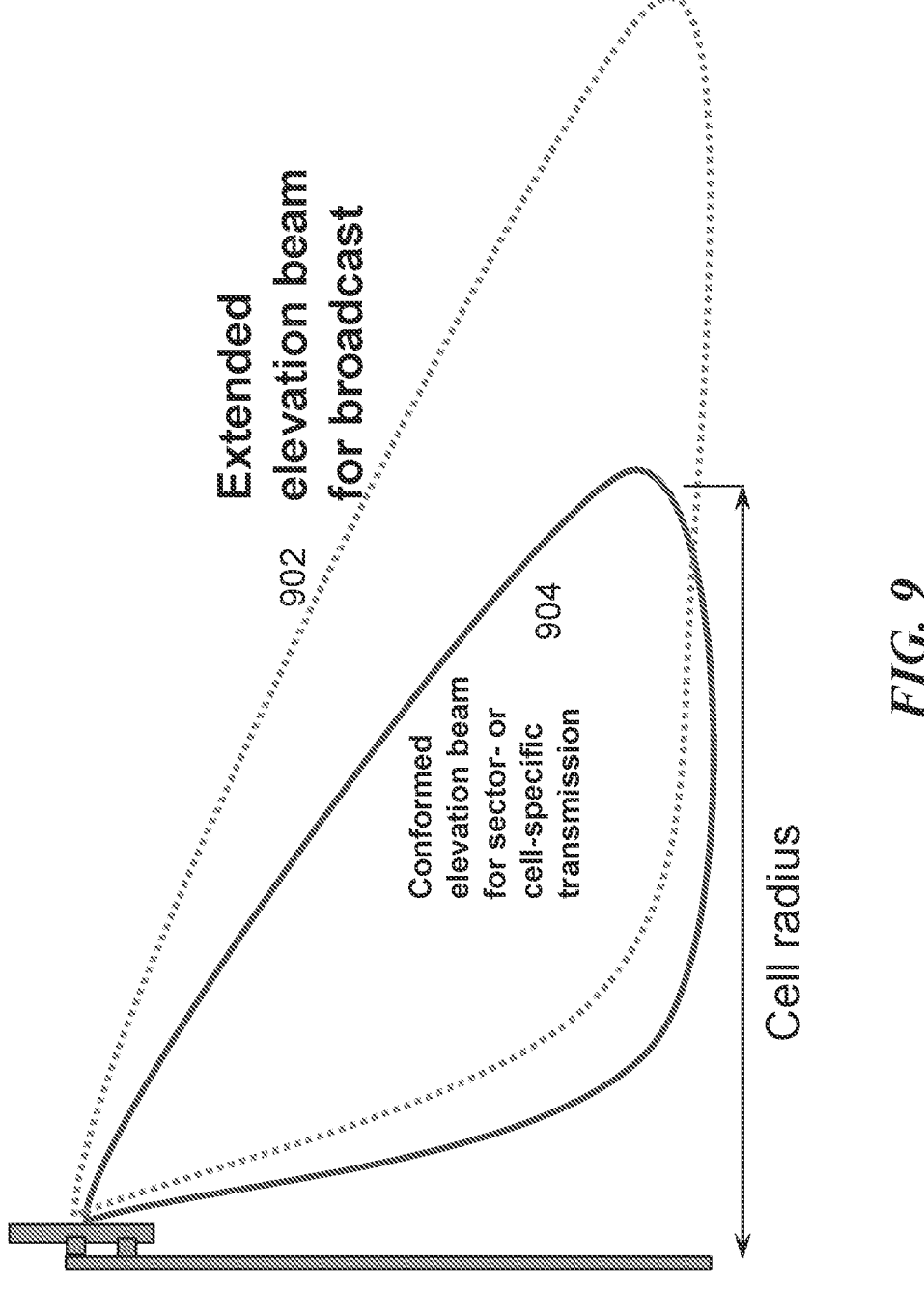
FIG. 9 is a graphical depiction of using a conformed elevation beam for unicast and sector-specific broadcast and an extended elevation beam for broadcast.

By shaping the azimuth beam patterns and activating a predefined elevation beam pattern, different radiation beam patterns are generated by the antennas for transmissions in different types of applications. For example, FIG. 8 depicts the radiation beam pattern of a cell sector antenna as viewed from overhead. As depicted in FIG. 8, a narrow beam 806 in azimuth is used for unicast; a sector-specific beam 804 is used for broadcast transmissions within the cell; and a broadcast beam 806 is used for multi-cell broadcast transmissions. FIG. 9 depicts the radiation beam pattern of a cell sector antenna as viewed in elevation. As shown in FIG. 9, an elevation beam 904 that is conformed within a cell boundary is used for unicast and sector-specific broadcast, whereas an elevation beam 902 that extends beyond the cell boundary is used for multi-cell broadcast.

Figures 10A, 10B:
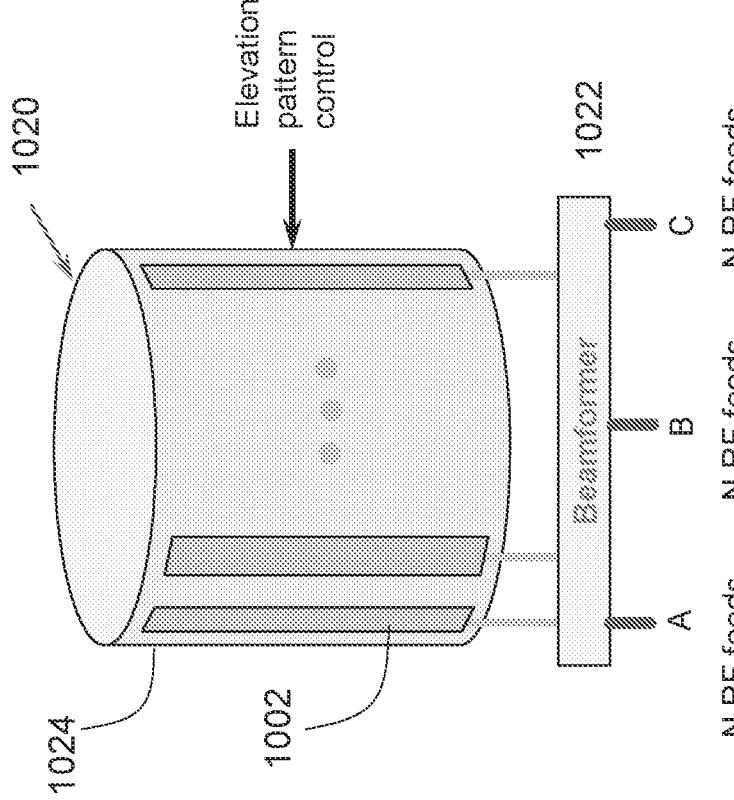
FIGS. 10A and 10B are perspective views of examples of antenna systems.

FIGS. 10A and 10B are each examples of an antenna system 412 that are controllable in azimuth and elevation, and are suitable for operating in different transmission modes in cellular communication and broadcasting. The antennas depicted in FIGS. 10A and 10B possess the following attributes:

1. the antenna consists of a plurality of antenna elements that can be controlled individually or collectively; and 2. the azimuth pattern and elevation pattern of the antenna can be shaped independently.

The antenna system depicted in FIG. 10A is a 2-dimensional antenna systems 1000, meaning that the antenna elements 1002 are mounted in an array on a substrate 1004 that orients the antenna elements in roughly a plane. One or more antenna systems 1000 may be mounted in a desired configuration in order to transmit within a particular region. For example, six of the antenna systems may be deployed in a regular hexagon shape in order to provide 360 degrees of coverage to a cell. In contrast, the antenna system depicted in FIG. 10B is a 3-dimensional antenna system 1020, meaning that the array of antenna elements 1002 are mounted on a substrate that orients the antenna elements in various directions. The substrate 1024 in FIG. 10B is a cylindrical substrate, creating an antenna capable of generating a 360 degree radiation pattern.

Figure 11:
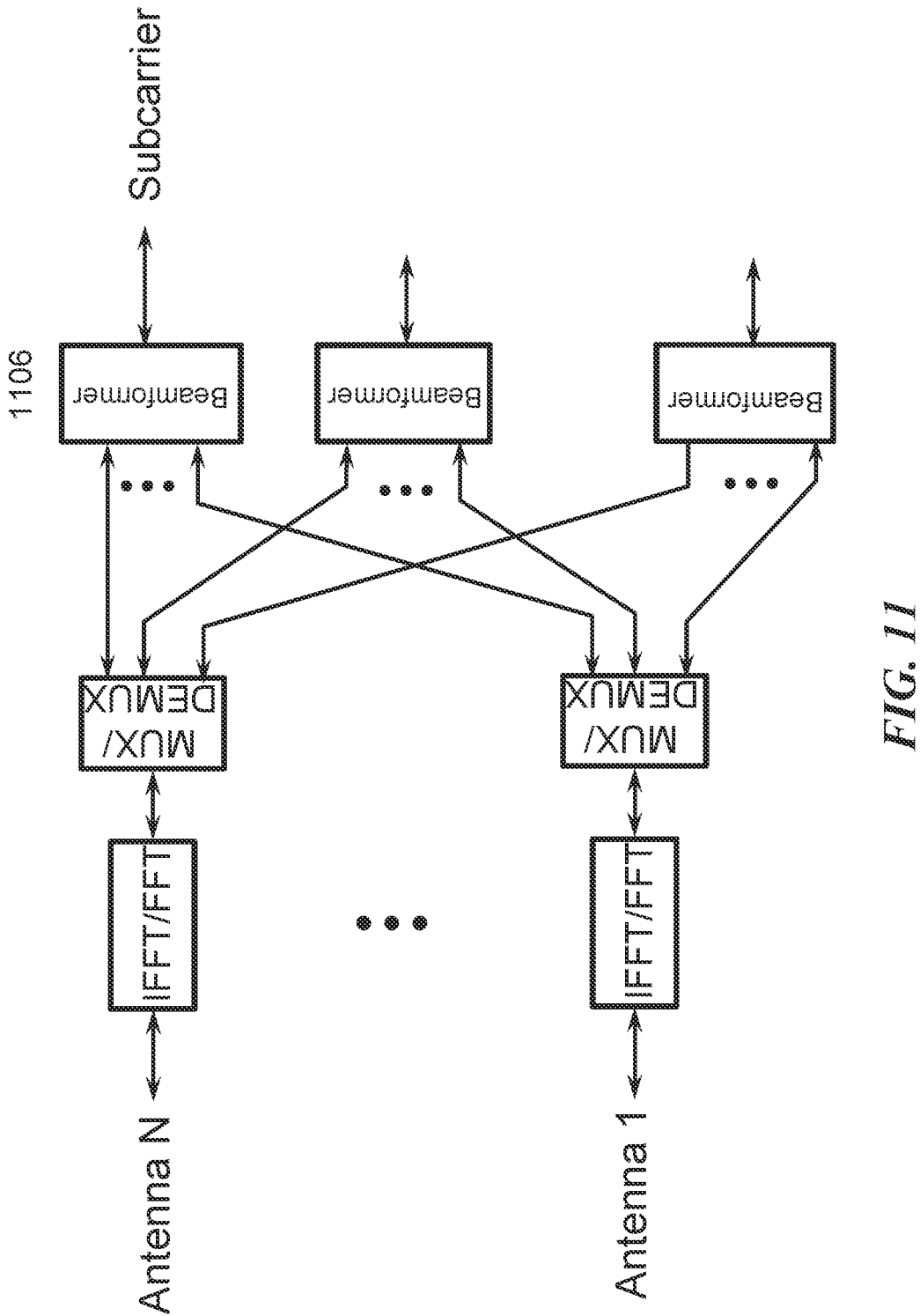
FIG. 11 is a block diagram of a beamforming process in an OFDMA system.

The azimuth beam pattern and the elevation beam patterns of the antenna systems in FIGS. 10A and 10B may be shaped in a variety of ways. With respect to the azimuth pattern, one or more beamformers 1022 may be coupled between the RF units (which provide RF signal feeds) and the antenna systems. The beamformers may be controlled by the controller 402. Those skilled in the art will appreciate that beamformers control the amplitude and phase of a signal at each transmitter, in order to create a pattern of constructive and destructive interference that controls the directionality of the radiation pattern emitted by the antennas. The azimuth patterns can be defined, either in a digital or analog manner, by the signal weights to the antennas. In general, the weights are applied in either time or frequency domain. In the case of OFDMA, the weights are applied to the corresponding subcarriers in the frequency domain within the beamformers 1106 as shown in FIG. 11.

Figure 12:
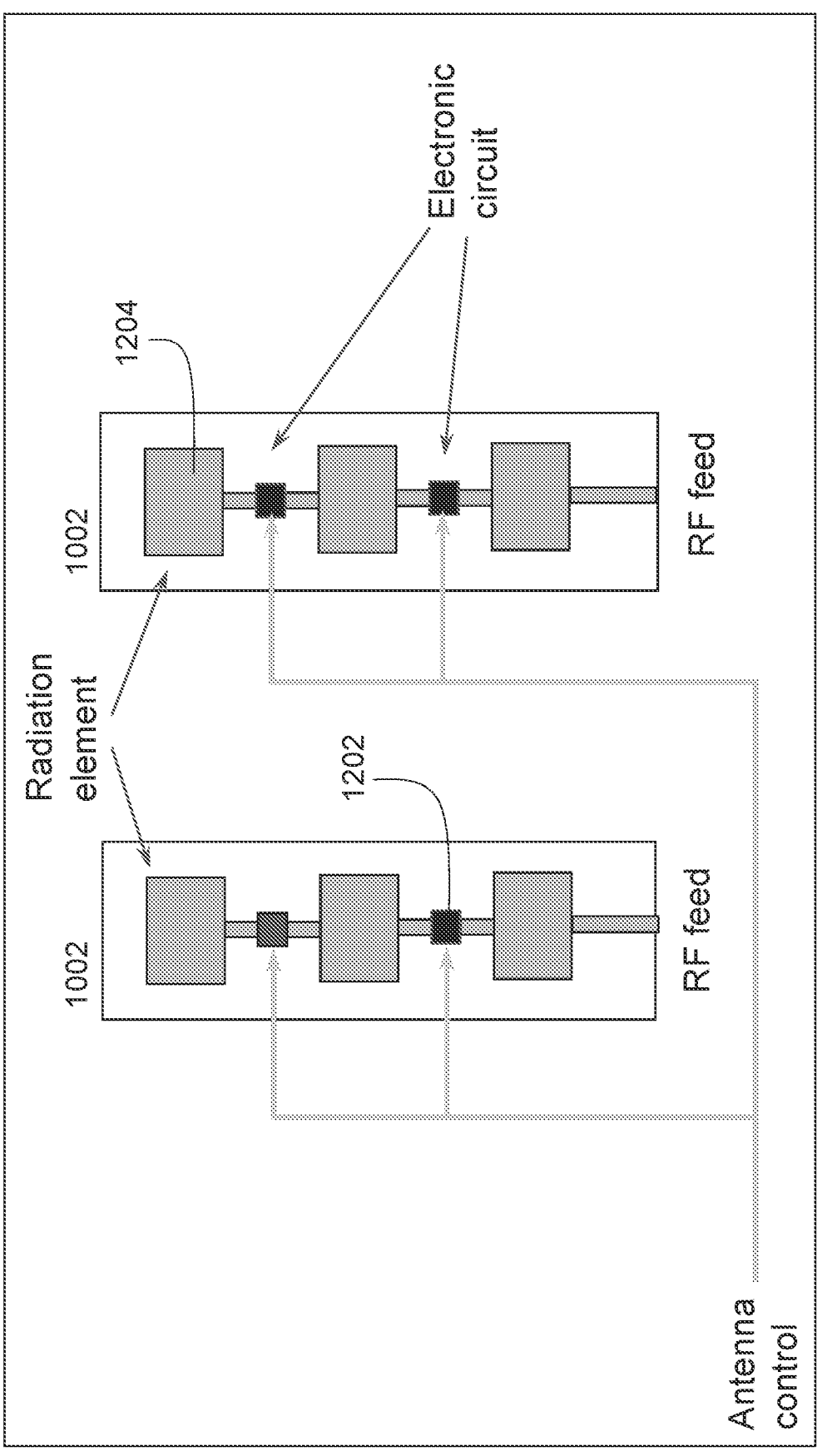
FIG. 12 is a perspective view of an antenna that generates different elevation beams.

With respect to the elevation beam pattern, a desired beam pattern can be achieved by controlling how antenna elements 1002 are activated by the system. FIG. 12 depicts two representative antenna elements 1002, such as might be fixed to an antenna substrate. The antenna elements comprise one or more electronic circuits 1202 that are surrounded by radiation elements 1204. By activating some or all of the electronic circuits 1202, the resulting emitted radiation beam may be adjusted in elevation. Certain elevation beam patterns may be predefined and can be activated, individually or in combination, by the antenna controller.

Figure 13:
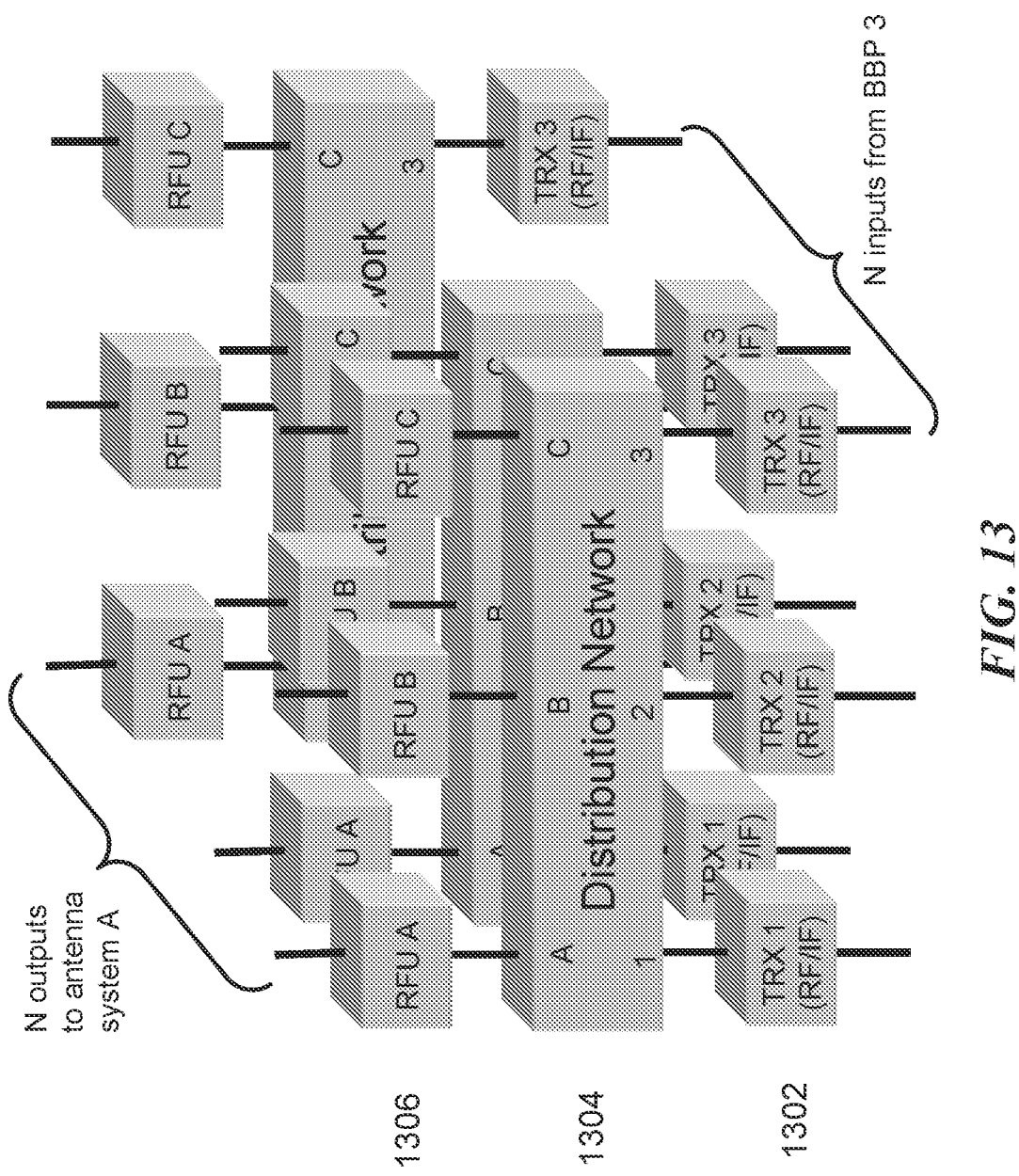
FIG. 13 is a block diagram of a bank of N distribution networks used in beamforming, transmit-diversity, or MIMO applications.

It will be appreciated that in certain applications of beamforming, transmit-diversity, or multiple-input-multiple-output (MIMO) transmissions in azimuth, the transmitter 400 design (including distribution network 408) may be modified to accommodate greater antenna complexity. FIG. 13 is a block diagram of a parallel transmitter construction for such an application. Specifically, the transmitter is modified to generate N outputs from each BBP, where N corresponds to the number of antenna subsystems in the azimuth dimension or to the number of azimuth beams need to cover a desired area (e.g., a sector). The outputs from the BBPs are coupled to an array of RF transceivers 1302, a bank of N distribution networks 1304, and an array of RF Units 1306. Outputs from the transmitter with a parallel construction are coupled to the antenna system and used for beamforming, transmit-diversity, or MIMO transmission.

The transmitter and antenna constructions disclosed herein enable the multiple-antenna system to switch between a variety of transmission modes that are suitable for different applications, such as audio, video, voice, etc. In one transmission mode, unicast data such as user-specific data and pilot subcarriers are transmitted to MSs by their serving BS using narrow beams (adaptively shaped or otherwise) or orthogonal beams in azimuth. Adaptive modulation and coding, as well as power control, can be jointly applied with these unicast-shaped beams.

In another transmission mode, sector-specific data and pilot subcarriers are transmitted to MSs by their serving BS using a shaped beam that covers its designated sector in azimuth. Signals that are associated the sector-specific data subcarriers include preamble, mid-amble, frame control header, downlink resource allocation, uplink resource allocation, or any information that is required to be disseminated to the MSs within the sector covered by the serving BS. Since the directivity gain of a sector beam is typically smaller than a narrow beam in the unicast case, a relatively robust modulation and coding scheme may be used for a sector-specific broadcast with a sector-shaped beam.

In still another transmission mode, broadcast data and pilot subcarriers are transmitted by a BS using a beam pattern that is shaped in both elevation and azimuth to maximize the network coverage. For example, in the same frequency network (SFN), it is desirable that the beam pattern of a BS should, to a certain degree, overlap in both azimuth and elevation with others, so as to achieve the optimal effects of macro-diversity. The gain from the macro-diversity should be able to offset, to a certain extent, the link-budget imbalance as compared to the sector beam case and narrow beam case.

The combination of a particular scheme of frequency reuse and a specific type of transmission can be represented by a configuration index, such as the configuration index represented in column 1 of Table 1. For example, an instruction to or from the controller 402 to modify the transmission mode may be in the form of the configuration index. The controller may use a look-up table or other data construct to determine the appropriate switch 606 settings and amplifier 602 gain settings that are associated with the specified configuration index, as exemplified in Table 1. In addition, the configuration index may also dictate the type of elevation beam used for a specific transmission (e.g., "conformed" or "extended" in Table 1). Given a configuration index, the controller will control the gain, switch setting, and beamformer or other antenna control to produce a desired beam pattern for transmission or reception.

Figure 14:
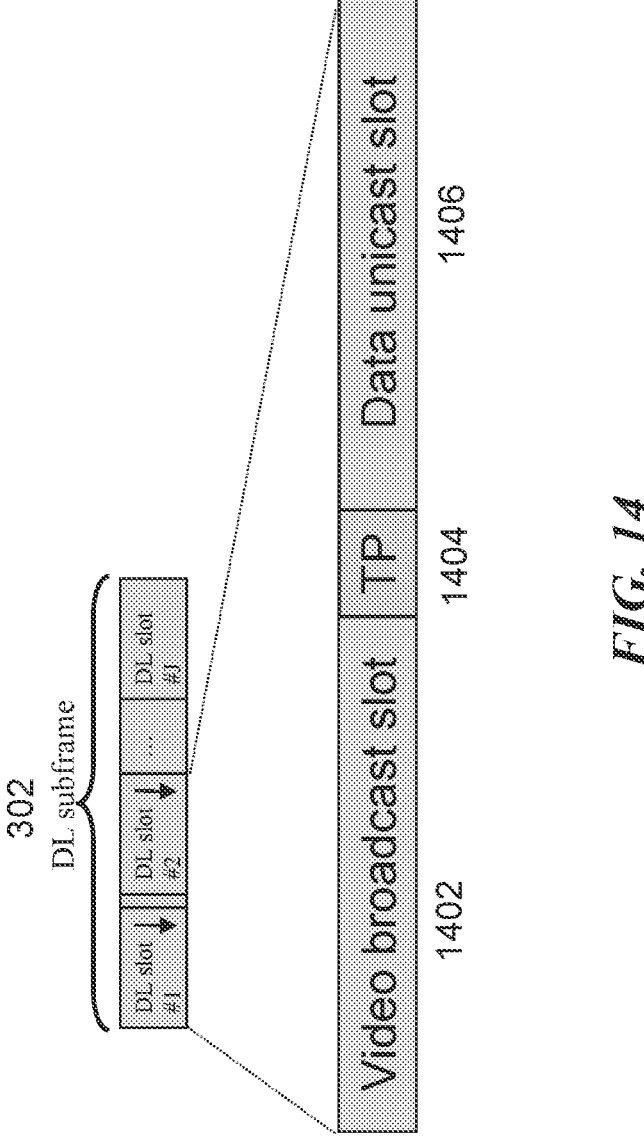
FIG. 14 is a graphical depiction of inserting a transition period between a video broadcast slot and a data unicast slot.

In some embodiments, mechanisms are employed to deal with the transition from one transmission mode to another transmission mode. In particular, a transition period (TP) may be inserted between transmission slots of different types of applications. For example, in the time structure shown in FIG. 3, DL Slot #1 may be a video broadcast slot and DL Slot #2 may be a data unicast slot. FIG. 14 is a block diagram depicting how the DL subframe 302 may be modified to incorporate a transition period. As depicted in FIG. 14, a transition period 1404 is inserted between a video broadcast slot 1402 and a data unicast slot 1406. The transition from one type of application to the next may require turning on/off switches and/or amplifiers, antenna control circuits, etc. The TP that is inserted must be sufficiently long for these devices to reach steady or near steady states. In addition, necessary MAC functions dealing with the TP such as scheduling and control messages will be performed by the MAC processor. It will be appreciated that the length of the transition period may be a constant that is selected based on the worst-case amount of time necessary for devices to reach steady or near steady state when switching from one transmission mode to another transmission mode. Alternatively, the length of the transition period may be varied so that it is optimized depending on the type of transition between transmission modes.

Instead of inserting a transition period to accommodate a switch from one transmission mode to another transmission mode, the transition can be scheduled to take place between OFDM symbols such that a portion of the cyclic prefix or postfix can be used for the switched devices to reach a steady or near-steady state, provided that the cyclic prefix or postfix is designed to be longer than the time required for the transition.

The above detailed description of embodiments of the system is not intended to be exhaustive or to limit the system to the precise form disclosed above. While specific embodiments of, and examples for, the system are described above for illustrative purposes, various equivalent modifications are possible within the scope of the system, as those skilled in the relevant art will recognize. For example, while processes are presented in a given order, alternative embodiments may perform routines having steps in a different order, and some processes may be deleted, moved, added, subdivided, combined, and/or modified to provide alternative or subcombinations. Each of these processes may be implemented in a variety of different ways. Further any specific numbers noted herein are only examples: alternative implementations may employ differing values or ranges.

These and other changes can be made to the invention in light of the above Detailed Description. While the above description describes certain embodiments of the technology, and describes the best mode contemplated, no matter how detailed the above appears in text, the invention can be practiced in many ways. Details of the system may vary considerably in its implementation details, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention under the claims.

What is claimed is:

1. A method performed by an apparatus for wireless transmission, the method comprising:

transmitting control information associated with an orthogonal frequency division multiple access (OFDMA) transmission; and transmitting the OFDMA transmission including at least a first beam pattern that carries first unicast data and a second beam pattern that carries second unicast data that is transmitted at least in-part simultaneously with the first unicast data, wherein the OFDMA transmission is formed by:

allocating a first set of subcarriers to a first recipient device and a second set of subcarriers to a second recipient device, wherein the first set of subcarriers includes first user-specific data subcarriers and first pilot subcarriers and the second set of subcarriers includes second user-specific data subcarriers and second pilot subcarriers; and applying a first set of complex weights to the first set of subcarriers to form the first beam pattern and applying a second set of complex weights to the second set of subcarriers to form the second beam pattern.

2. The method of claim 1, wherein the control information includes downlink resource allocation information indicating the first set of subcarriers and the second set of subcarriers.

3. The method of claim 1, wherein the control information allocates first groups of subcarriers to the first recipient device and allocates second groups of subcarriers to the second recipient device.

4. The method of claim 3, wherein the control information includes a preamble.

5. The method of claim 4, wherein the preamble is decodable by the first recipient device and the second recipient device.

6. The method of claim 1, further comprising transmitting a mid-amble.

7. The method of claim 1, wherein applying the first set of complex weights includes:
applying a complex weight per subcarrier; or
applying a subset of complex weights per a group of multiple subcarriers.

8. The method of claim 1, wherein the first beam pattern is directionally different in azimuth than the second beam pattern.

9. The method of claim 1, wherein the first beam pattern is directionally different in elevation than the second beam pattern.

10. The method of claim 1, wherein the OFDMA transmission is based on modulation and coding using link adaptation.

11. The method of claim 1, wherein a more robust modulation and coding is used for the control information than used for the first unicast data and used for the second unicast data.

12. The method of claim 1, wherein the transmitting the OFDMA transmission further includes forward error correction encoding, interleaving, modulation, and mapping modulated data to subcarriers.

13. The method of claim 1, wherein the transmitting the OFDMA transmission further includes:
performing an inverse transform on the first set of subcarriers and the second set of subcarriers to generate time domain orthogonal frequency divisional multiplexing (OFDM) symbols;
adding cyclic prefixes onto the time domain OFDM symbols; and
transmitting the time domain OFDM symbols and cyclic prefixes via a plurality of antennas.

14. The method of claim 1, wherein the transmitting the OFDMA transmission includes transmitting at least a portion of the first unicast data and at least a portion of the second unicast data in a same orthogonal frequency division (OFDM) symbol that includes both the first set of subcarriers and the second set of subcarriers.

15. The method of claim 1, wherein the unicast data includes a frame control field.

16. An apparatus comprising:
a controller and a transmitter;
wherein the controller and the transmitter are collectively configured to:
transmit control information associated with an orthogonal frequency division multiple access (OFDMA) transmission; and
transmit the OFDMA transmission including at least a first beam pattern that carries first unicast data and a second beam pattern that carries second unicast data that is transmitted at least in-part simultaneously with the first unicast data, wherein the OFDMA transmission is formed by:
allocating a first set of subcarriers to a first recipient device and a second set of subcarriers to a second recipient device, wherein the first set of subcarriers includes first user-specific data subcarriers and first pilot subcarriers and the second set of subcarriers includes second user-specific data subcarriers and second pilot subcarriers; and
applying a first set of complex weights to the first set of subcarriers to form the first beam pattern and applying a second set of complex weights to the second set of subcarriers to form the second beam pattern.

17. The apparatus of claim 16, wherein the control information allocates first groups of subcarriers to the first recipient device and allocates second groups of subcarriers to the second recipient device, and wherein the control information includes a preamble that is decodable by the first recipient device and the second recipient device.

18. The apparatus of claim 16, wherein:
a complex weight is applied per subcarrier; or
a subset of complex weights is applied per a group of multiple subcarriers.

19. The apparatus of claim 16, further comprising a plurality of antennas, wherein the controller and the transmitter are further collectively configured to:
perform an inverse transform on the first set of subcarriers and the second set of subcarriers to generate time domain orthogonal frequency divisional multiplexing (OFDM) symbols;
add cyclic prefixes onto the time domain OFDM symbols; and
transmit the time domain OFDM symbols and cyclic prefixes via the plurality of antennas.

20. The apparatus of claim 16, wherein the controller and the transmitter are further collectively configured to transmit at least a portion of the first unicast data and at least a portion of the second unicast data in a same orthogonal frequency division (OFDM) symbol that includes both the first set of subcarriers and the second set of subcarriers.

* * * * *